May 15, 1934.  B. P. MIRABELLA  1,958,762
APPARATUS FOR MAKING AND FILLING CONTAINERS
Filed Jan. 21, 1932  4 Sheets-Sheet 1

INVENTOR
BENEDICT P. MIRABELLA
BY
ATTORNEY

May 15, 1934. B. P. MIRABELLA 1,958,762
APPARATUS FOR MAKING AND FILLING CONTAINERS
Filed Jan. 21, 1932 4 Sheets-Sheet 2
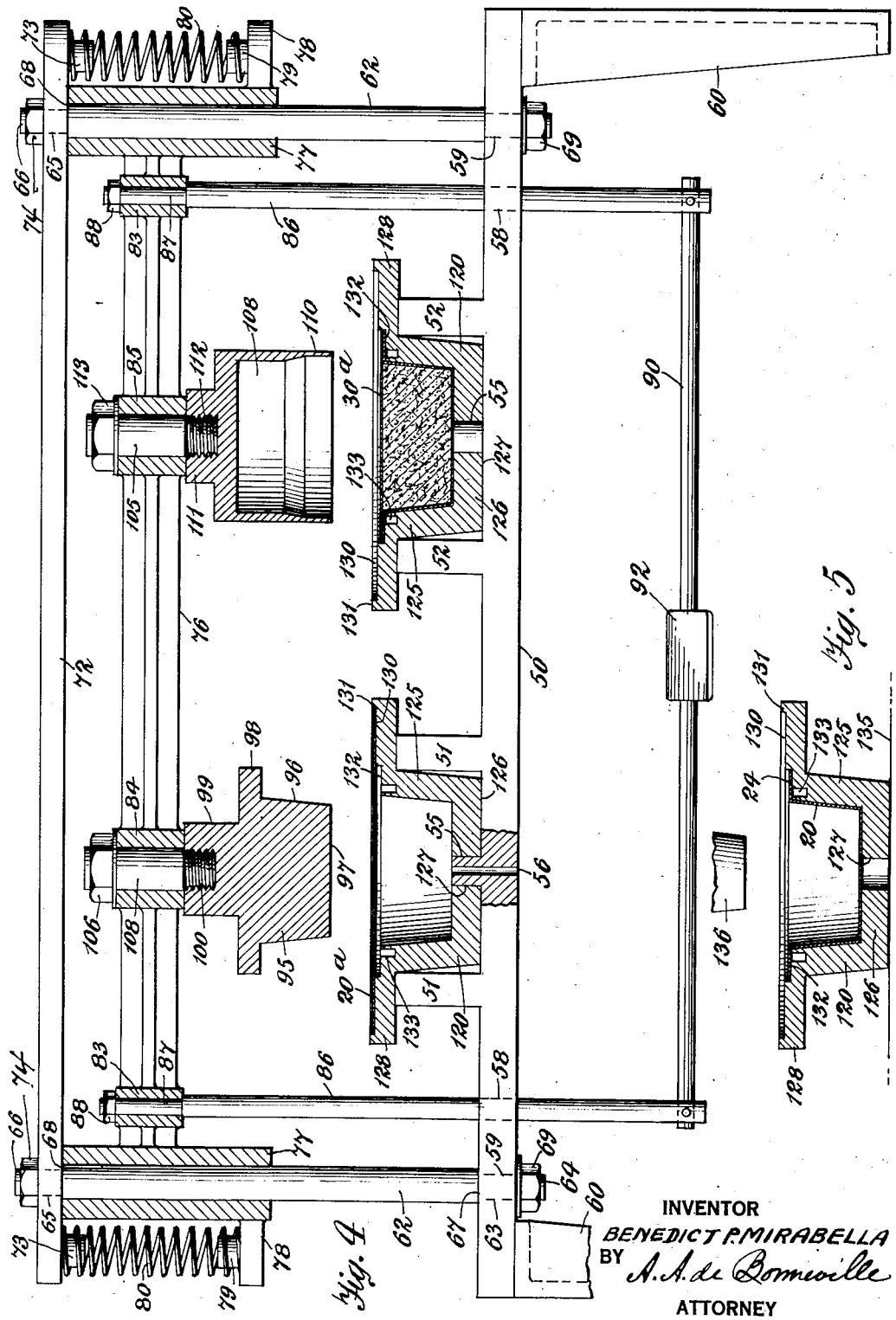
INVENTOR
BENEDICT P. MIRABELLA
BY A. A. de Bonneville
ATTORNEY

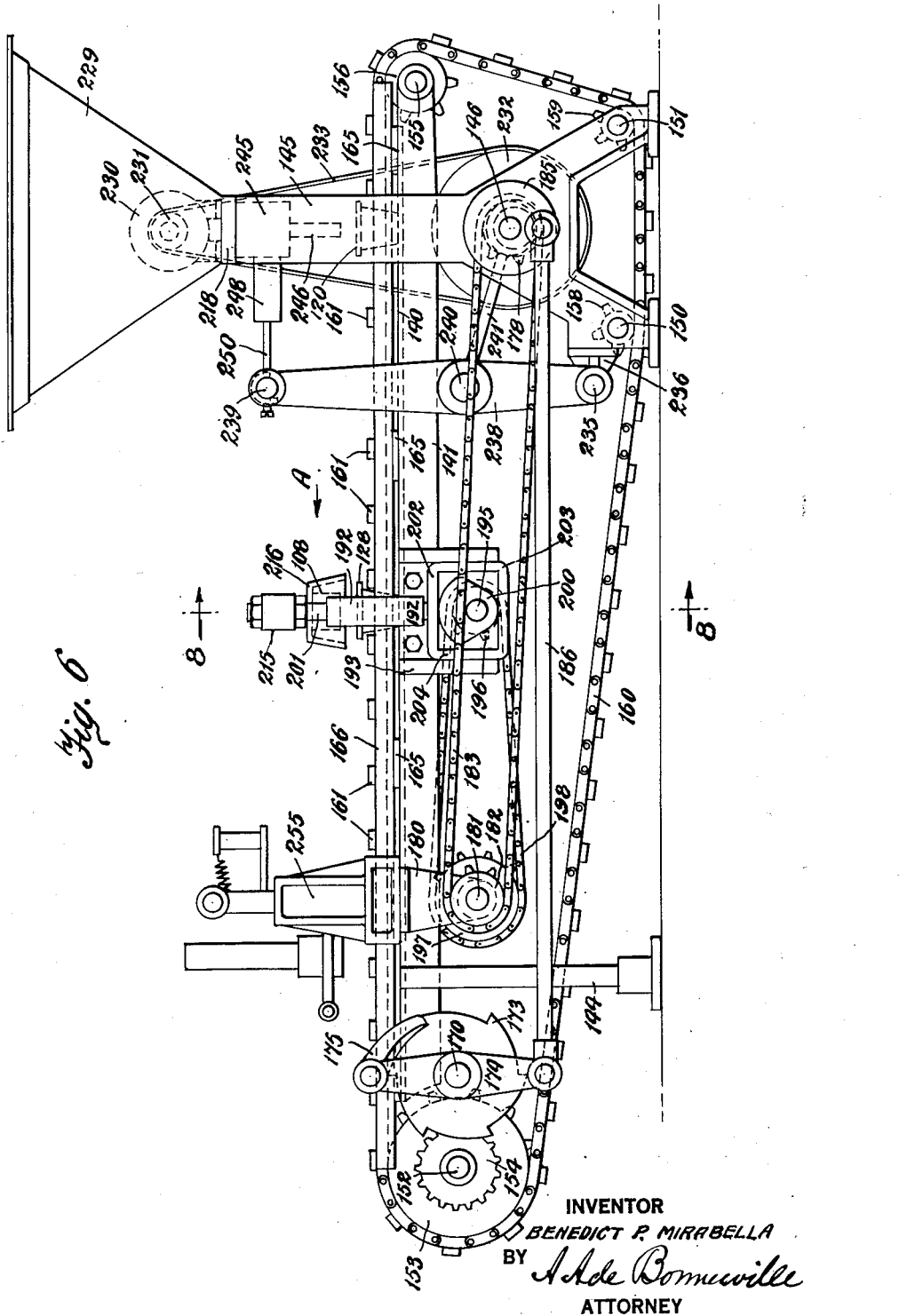

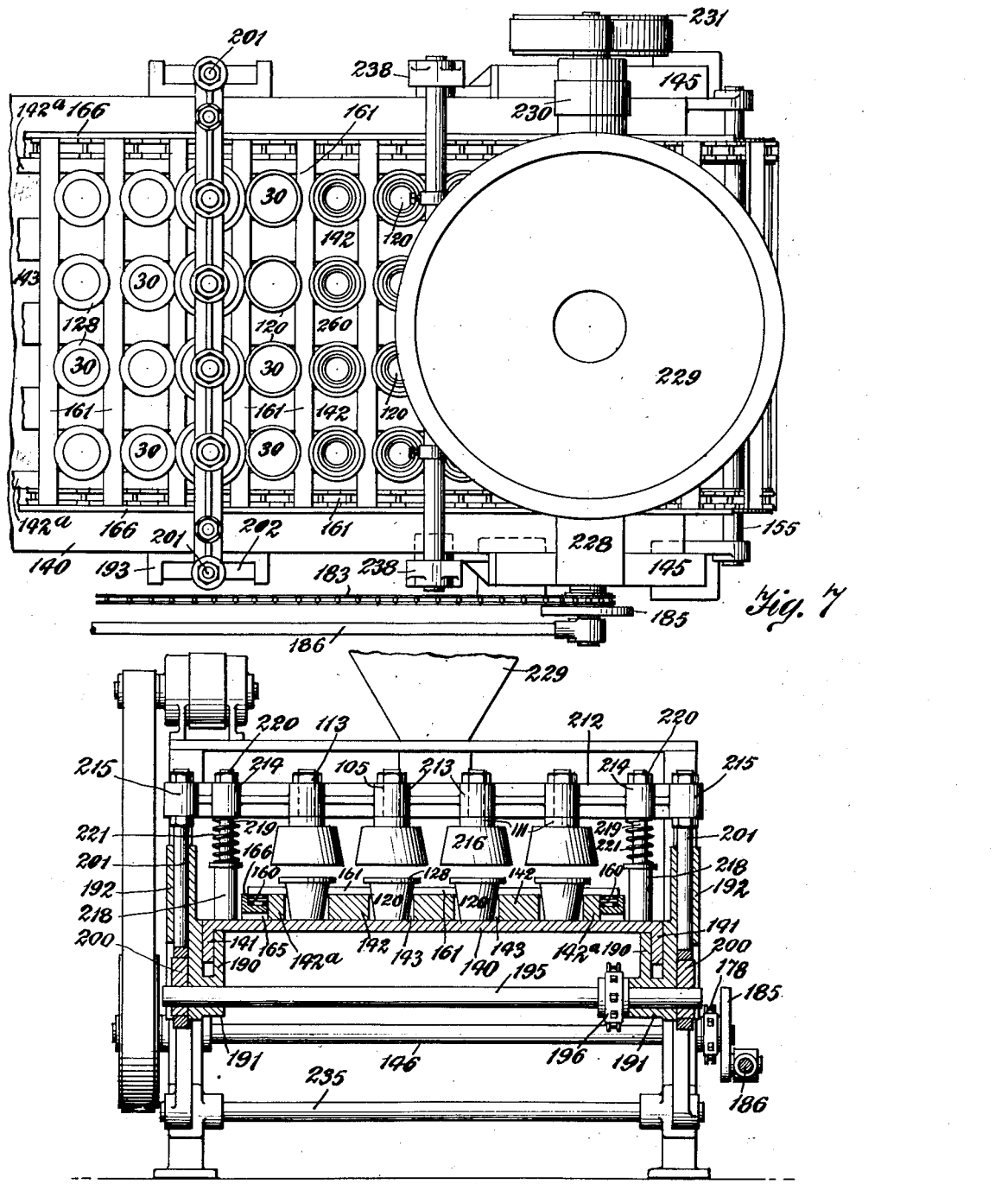

Patented May 15, 1934

1,958,762

UNITED STATES PATENT OFFICE 1,958,762

APPARATUS FOR MAKING AND FILLING CONTAINERS

Benedict P. Mirabella, Brooklyn, N. Y., assignor of one-half to Columbia Cheese Company, Inc., Newark, N. J., a corporation of New Jersey Application January 21, 1932, Serial No. 587,937

4 Claims. (Cl. 93—6)

This invention relates to apparatus for making and filling containers.

A container made by the apparatus is shown and described for the purpose of exemplifying the invention.

The object of the invention is the production of apparatus for making containers with covers, which will be air tight and water proof.

The second object of the invention is the production of apparatus for making a container with a cover, both of thin sheet metal which will be air tight and waterproof.

The third object of the invention is the production of apparatus for making an airtight and waterproof container with a cover, both of tin foil or other sheet metal with means for introducing cheese and other material into said container.

Figure 1:
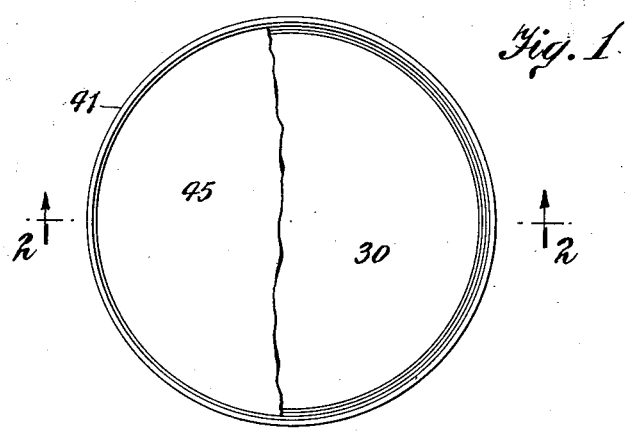
Figure 2:
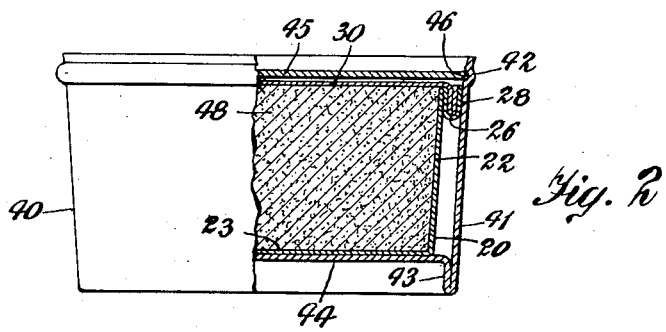
Figure 3:
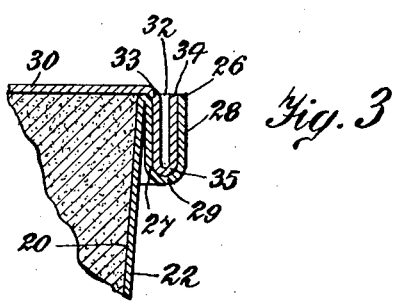

In the accompanying drawings, Fig. 1 represents a top plan view of an exemplification of the container having a portion broken away, made by the apparatus and a portion of a carton; Fig. 2 shows a partial elevation of the carton for the container and a partial section as on the line 2, 2 of Fig. 1; Fig. 3 shows an enlarged vertical section of a portion of the container during its course of manufacture; Fig. 4 represenst an exemplification of a table with appurtenances and dies in vertical section, adapted to be used in the production of the container; Fig. 5 indicates a vertical section of a die and the container indicating the step just before filling the container with its charge of cheese or other material; Fig. 6 represents a side of a multiple filling machine, with the apparatus of the invention somewhat modified, connected thereto; Fig. 7 shows a partial top view of Fig. 6, and Fig. 8 is a partial section of Fig. 6 on the line 8, 8.

Referring to Figs. 1, 2, and 3, the container per se is designated in its entirety by the numeral 20, and comprises the cup shaped body portion having the inclined or conical shaped side wall 22 and the bottom wall 23, in this instance of tin foil.

The side wall 22 at its upper end has formed therewith the U shaped annular pocket designated in its entirety by the numeral 26. The said pocket 26 comprises the inner annular member 27 and the outer annular member 28, spaced from the member 27. The said members are connected at their lower portions by the curved connecting portion or crown 29.

A disc shaped cover 30, in this instance of tin foil for the container 20 has formed therewith the U shaped annular pocket designated in its entirety by the numeral 32. The pocket 32 is seated in the pocket 26 and comprises the inner annular member 33 and the outer annular member 34 initially spaced from the member 33. The said members 33 and 34 are connected at their lower portions by the connecting portion or crown 35.

It will be noted that the outer faces of the members 33 and 34 bear against the inner faces of the members 27 and 28. When the pockets 26 and 32 are in operative tight position the inner faces of the members 33 and 34 bear against each other and the pocket 26 is forced against the wall 22.

The container 20 is placed within the carton 40 preferably of paper.

The carton 40 comprises the conical shaped side wall 41, which has formed therein adjacent to its upper edge, on its inner face, the locking groove 42. The lower portion of the wall 41 has formed therewith the return bend annular flange 43, which joints with the bottom wall 44. A detachable disc shaped cover 45, preferably of paper has its circumferential edge 46 seated in the groove 42. The cheese or other material in the container is shown at 48.

Referring to Fig. 4, a table is indicated with the platform 50, that has extend:ng up therefrom the pairs of similar supporting blocks 51 and 52. Centering pins 55 having the axial air openings 56 extend up from the platform 50. Guide openings 58 and openings 59 extend through the platform 50. The legs for the platform are shown at 60.

Guide rods 62 are indicated with shanks 63 having the threaded ends 64, and with shanks 65 having the threaded ends 66. Both said shanks are smaller in diameter than the main portions of the guide rods 62 and form therewith the shoulders 67 and 68. The shank 63 extends through the openings 59 and is provided with the clamping nuts 69. Upon the shoulders 68 is supported the cross brace 72 having the pins 73 extending from its lower face. Nuts 74 are provided for the threaded ends 66 to clamp the cross brace 72 in place.

A cross head 76 has formed at its ends the guide sleeves 77, which are slidably supported on the guide rods 62 and have extending therefrom the lugs 78. Pins 79 extend up from the lugs 78. Helical springs 80, have their ends connected to the pins 73 and 79. The cross head 76 has formed therewith, the pair of similar sleeves 83 and the pair of similar sleeves 84 and 85. Guide rods 86 have each formed at their upper ends the shanks 87 smaller in diameter than the body portions thereof. The said shanks 87 are provided with threaded ends for the nuts 88, and are seated in the openings of the sleeves 83. The lower ends of the guide rods 86 are connected by the cross bar 90. The guide rods 86 are guided in the guide openings 58. A foot piece 92 is fastened to the cross bar 90.

Coaxial with the sleeve 84 is positioned the male die 95, having the conical shaped side wall 96, the bottom wall 97, the annular flange 98, and the plug 99 at its upper end. The plug 99 has formed therein a threaded opening 100 coaxial with the longitudinal axis of said male die 95. A stud 105, extends into the opening of the sleeve 84 and its lower threaded end engages the threaded opening 100 of the plug 99. The other threaded end of the stud 105 engages the nut 106, by means of which the die 95 is detachably clamped to the cross head 76.

A male die 108, has integral therewith the tubular wall 110. At the upper end of the die 108 is formed the plug 111 having the threaded opening 112 coaxial with the longitudinal axis of said die 108. A second stud 105 extends into the opening of the sleeve 85 and its lower threaded end engages the threaded opening 112 of the plug 111. The other threaded end of the latter stud 105 engages the nut 113, by means of which the female die 108, is detachably clamped to the cross head 76.

Upon the platform 50 and upon the pairs of supporting blocks 51 and 52, are detachably supported the similar cup shaped female dies designated in their entireties by the numeral 120.

Each of the dies 120 comprises the conical shaped side wall 125, the bottom wall 126 having the opening 127, and the annular flange 128 at its upper end. The top face 130 of said flange has formed therewith the supplemental annular flange 131. A lower face of the flange 128 is indicated at 132 and an annular pocket 133 extends downwardly from the face 132.

A female die 120, see Fig. 5, is shown supported upon the platform 135 of a filling machine, having the discharge nozzle 136 and other appurtenances not shown.

The latter die 120 is indicated with its conical shaped side wall 125, the bottom wall 126 having the opening 127 and the annular flange 128, as already described. The top face of the flange 128 is shown at 130 with the supplemental flange 131. A lower face of the flange 128 is indicated at 132 and the annular pocket is indicated at 133 as already described.

To start making the container 20, the table having the platform 50 may be supposed to have its appurtenances positioned as indicated in Fig. 4 with the cross head 76 in its raised position.

A circular disc 20a of tin foil is placed upon the top face 130 of the die 120, and said die is placed upon the platform 50 and upon the supporting blocks 51, the centering pin 55 engaging the opening 127 of the die between the blocks 51. No die at this time is supported on the supporting blocks 52. The operator now bears on the foot piece 92, which lowers the cross head 76 and thereby the male die 95 lowers, and the disc 20a is pressed to its conical shape to form the container 20 with its side wall 22, bottom wall 23, and annular flange 24, as indicated in Fig. 5. The flange 24 is forced upon the lower face 132 of the die 120 by the annular flange 98.

The foot piece 92 is released and the springs 80 automatically raise the cross head 76 and the male die 95. The latter is thereby withdrawn from the container, as indicated in Fig. 4. During the descent of the male die 95, the air in the die 120 escapes through the air opening 56. The female die 120 with the partially formed container 20 is next taken from the platform 50 and the supporting blocks 51 and placed upon the platform 135 of the filling machine, see Fig. 5 and the cheese 48 is charged into the container 20 by means of the discharge nozzle 136 and its appurtenances not shown.

The die 120, with the partly made container 20 is now removed from the platform 135 and again placed upon the platform 50 and the supporting blocks 52, the opening 127 engaging the centering pin 55, between the supporting blocks 52.

The operator now places a circular disc 30a upon the partly finished container, with its circumferential edge in register with the edge of the annular flange 24 of said partly made container 20. Next the operator again bears on the foot piece 92 by which the male die 108 is lowered and the tubular wall 110 forces the annular flange 24 with the corresponding portion of the circular disc 30a into the annular pocket 133, of the female die 120, and the U shaped annular pockets 26 and 32 are formed, with the pocket 32 seated in the pocket 26 as indicated in Fig. 3.

The die 120, with the container 20 is lifted from the centering pin 55, between the supports 52 and removed from the table 50. The die can be slid on the supports 52, as there is no connecting member between the latter. The die 120 is turned upside down to discharge the container 20 with its disc shaped cover 30. The container 20 is now inserted into the carton 40, with the bottom wall 23 bearing on the bottom wall 44 of said carton.

While the container 20 is being seated in the carton 40, the members of the U shaped annular pockets 26 and 32 are forced in tight contact with each other, and the annular member 27 of the pocket 26 is tightly forced against the wall 22 of the container 20, as shown in Fig. 2. This result is obtained by reason of the pressure brought on the outer face of the member 28 when contacting with the inner face of the wall 41 of the carton 40, as the container 20 is inserted into said carton. The operator finally springs the cover 45 of the carton 40 in place with its circumferential edge seated in the locking groove 42.

Referring to Figs. 6, 7 and 8 a multiple filling machine is indicated having the platform or table 140 with the side walls 141, and the longitudinal guide strips 142 and 142a. Longitudinal guide ways 143, are formed between the strips 142 and 142a. Legs 144 support the rear end of said table 140 and the front end of the table 140 is supported by a pair of frames each designated in its entirety by the numeral 145. A main driving shaft is indicated at 146, which has its end portions journaled in the frames 145. Lower cross shafts 150 and 151 have their ends journaled in the frames 145. At the rear end of the filling machine is journaled the cross shaft 152, which has fastened thereto a pair of sprocket chain wheels 153, one of which is shown, and has also fastened thereto the spur gear 154. At the front end of the machine is journaled the cross shaft 155, which has fastened thereto a pair of sprocket chain wheels 156. A pair of sprocket chain wheels 158 are fastened to the shaft 150, and a pair of sprocket chain wheels 159 are fastened to the shaft 151. A sprocket chain 160, engages each of the series of sprocket chain wheels 153, 156, 158 and 159. Driving cross strips 161 have their ends fastened to the sprocket chains 160. The sprocket chains 160 with the cross strips 161 constitute a conveyer.

At the sides of the top face of the table 140 are fastened the spacer blocks 165, and to the latter are fastened the angle shaped guide plates 166, for the sprocket chains 160.

A shaft 170 is supported below the table 140, and has fastened thereto a spur gear, not shown, which meshes with the spur gear 154. A ratchet wheel 173 is fastened to the shaft 170 and the lever 174 is supported to the shaft 170. A pawl 175 for the ratchet wheel 173 is pivoted to the upper arm of the lever 174. To the drive shaft 146 is fastened a sprocket chain wheel 178. A pair of journal brackets 180 one of which is shown are fastened to the side walls 141, and have journaled therein the cross shaft 181. A sprocket chain wheel 182 is fastened to the shaft 181, and a sprocket chain 183 connects the sprocket chain wheels 178 and 182. A disc 185 is fastened to the shaft 146 and a connecting rod 186 has its ends pivoted to the disc 185 and the lower arm of the lever 174. To the inner faces of the side walls 141 are fastened the brackets 190, that each have integral therewith the journal bearing 191, the vertical guide sleeve 192, and the guide strips 193. In the bearings 191 is journaled the cross shaft 195. On the shaft 195 is fastened the sprocket chain wheel 196. A sprocket chain wheel 197 is fastened to the shaft 181 and a sprocket chain 198 connects the sprocket chain wheels 196 and 197. A cam 200 is fastened to each of the ends of the shaft 195. A vertical shaft 201 is guided in each of the sleeves 192 and each has integral with its lower end the rectangular guide band having the upper member 202, the lower member 203 and the side members 204. The members 204 bear against the guide strips 195.

A crosshead extending crosswise over the table 140 is indicated at 212 and has integral therewith the bosses 213, 214 and 215. The longitudinal axes of the bosses 213 are in the vertical planes of the longitudinal centers of the guide ways 143. The shafts 201 extend through the bosses 215 and are fastened thereto by means of nuts as indicated. Pillars 218 with the shanks 219 threaded at their upper ends, extend up from the table 140. The shanks 219 extend through the bosses 214, and nuts 220 engage the threaded ends of the shanks 219. A spring 221 encircles each shank 219 and bears between pillar 218 and its accompanying boss 214.

Studs 105 as already described extend through the bosses 213 and are shown with their nuts 113. Male dies 108 as already described are shown with their plugs 111. Each male die 108 has integral therewith the centering hood 216.

To the top ends of the frames 145 are connected the cross plate 228. A hopper 229 extends up from the cross plate 228. An electric motor 230 is positioned on the cross plate 228. A pulley 231 is fastened to the armature shaft of the electric motor 230. A pulley 232 is fastened to the driving shaft 146, and a belt 233 connects the pulleys 231 and 232.

A shaft 235 has its ends supported in journal brackets 236 extending from the frames 145. A pair of oscillating levers 238 have each one end supported on the shaft 235. A shaft 239 connects the upper ends of the levers 238. A shaft 240 connects the levers 238. An eccentric rod 241 with its appurtenances is interposed between the shafts 146 and 240. A discharge chamber 245 extends from the hopper 229 and is provided with four discharge nozzles 246, one of which is shown. Four piston cylinders 248 extend from the chamber 245. A piston not shown each having the piston rod 250, is provided for each of the cylinders 248. The said piston rods are detachably connected to the shaft 239.

When the apparatus of the invention is used with the multiple filling machine shown in said Figs. 6, 7, and 8, the hopper 229 of the said filling machine is charged with the cheese in a semi-fluid state, and the multiple filling machine is started by means of the electric motor 230.

Crossrows of female dies 120 each with the container 20 disposed as shown in Fig. 5 are placed upon the table 140 in the guide ways 143, between the driving cross strips 161. The sprocket chains 160 have imparted thereto an intermittent movement in the direction of the arrow A by means of the pawl 175, the rachet wheel 173 and the elements between said ratchet wheel and the sprocket chain wheel 153. When the dies 120, are brought under the discharge nozzles 246, the pistons having the piston rods 250 draw the cheese from the hopper 229 and discharge the requisite quantity into each of said dies 120. The dies 120 with their charges of cheese are moved toward the cross head 212, but before being positioned under the cross head 212 the operator places the disc shaped cover 30ᵃ in position, see Fig. 7. The dies 120 with their contents are next positioned under the cross head 212, see Figs. 6 and 8. While the sprocket chains 160, are at rest the cams 200 revolve and through the intervention of the shafts 201 and their appurtenances, the cross head 212 is pulled down. Thereby the male dies 108 with their centering hoods 216 are lowered. The said centering hoods 216 contact with the annular flanges 128. If the dies 120 are not axially in line with the male dies 108, the former will be moved to proper position. The rectangular clearance spaces 260 formed with the strips 142 142ᵃ and the strips 161 are just large enough to allow slight movements of the dies 120. Just after the dies 120 are placed in proper position the male dies 108 form the pockets 26 and 32 as already described.

The cams 200 then raise the male dies 108 with their hoods 216. Next the dies 120 are again moved in the direction of the arrow A, with the containers 20 and their covers 30, see Fig. 7. The dies 120 with the containers 20 are then removed from the filling machine and placed in cartons 40 has already described.

Various modifications may be made in the invention and the present exemplification is to be taken as illustrative and not limitative thereof.

Having described my invention what I claim is:

1. In an apparatus of the character described the combination of a platform, an intermittently moved conveyer on the platform, cross rows of female dies on said platform moved by said conveyer longitudinally on said platform, each of said dies containing the cup shaped body portion of a container, means to simultaneously charge each cross row of said dies with material, a reciprocating cross head positioned crosswise over said conveyer, dies extending from the crosshead and means integral with the dies on the crosshead to center the dies on the platform with the dies of the crosshead, when the dies on the platform are positioned under the dies of the crosshead.

2. In an apparatus of the character described the combination of a platform having longitudinal guide ways in the face thereof, a pair of intermittently driven sprocket chains on said platform at the sides thereof, driving cross strips having their ends fastened to said sprocket chains and forming with said guide ways clearance spaces, female dies on said platform in said clearance spaces, each of said dies containing the body portion of a container, a series of discharge nozzles for the material to be charged into said containers above said clearance spaces, means to force said material from said nozzles into said containers, a reciprocating crosshead supported crosswise over said platform, dies extending from said crosshead, and a hood extending from each die of said crosshead coacting with the dies on the platform to align the dies on the platform with the dies of the crosshead, the coaction of the dies of the crosshead and on the platform adapted to tightly clamp a cover on each body portion of each container.

3. In an apparatus of the character described the combination of a platform, longitudinal guide strips on the platform forming longitudinal guide ways, a pair of intermittently driven sprocket chains on said platform at the side thereof, driving cross strips having their ends fastened to said sprocket chains and forming with said guide ways clearance spaces, female dies positioned on said platform in said clearance spaces, each of said dies containing the cup shaped body portion of a container, a series of discharge nozzles for the material to be charged into said containers above said conveyer and in axial alignment with said clearance spaces, means to force said material from said nozzles into said containers, a cross head flexibly supported crosswise over said conveyer, dies extending from said crosshead, a centering hood integral with each of the latter dies and means to reciprocate the crosshead, and thereby through the coaction of the dies on the platform and the dies of the crosshead when in axial alignment securing a cover to each body portion of each container.

4. In an apparatus of the character described the combination of a platform, side walls integral with the platform, brackets fastened to said side walls, a journal bearing integral with each bracket, a vertical guide sleeve integral with each bracket, a pair of guide strips integral with each bracket, a cross shaft journaled in said journal bearings, means to turn the shaft, a cam fastened to each of the ends of the shaft, a vertical shaft guided in each of said vertical sleeves, a rectangular guide band, comprising an upper member, a lower member and side members at the lower end of each vertical shaft, the said vertical members of the guide band bearing against said guide strips, said guide bands coacting with said cams, longitudinal guide strips for the platform, forming longitudinal guide ways, a conveyer slidably positioned on the platform, means to move the conveyer, driving cross strips fastened to the conveyer, female dies adapted to be positioned in said longitudinal guide ways between said cross strips, a cross head extending crosswise over said platform, a plurality of bosses integral with said crosshead having their longitudinal axes perpendicular to and in line with the longitudinal axes of said guide ways, a boss at each end of the crosshead, each of said vertical shafts extending through one of the latter bosses and fastened thereto, another pair of bosses integral with said cross-head, pillars extending up from the platform, a shank at the upper end of each pillar guided in one of the latter bosses, a spring encircling each shank between its pillar and coacting boss, a stud extending from each of the latter bosses, a die fastened to each stud and a centering hood integral with each of the latter dies.

BENEDICT P. MIRABELLA.